Jan. 27, 1959 R. B. WILLIAMS 2,871,443
PROCESS FOR REGISTERING THE RELATIVE DEGREE OF BRANCHING
OF A HYDROCARBON MATERIAL CONTAINING ALKYL GROUPS AND
FOR CONTROLLING A PROCESS IN RESPONSE
TO THE REGISTRATION
Filed March 14, 1956 2 Sheets-Sheet 1
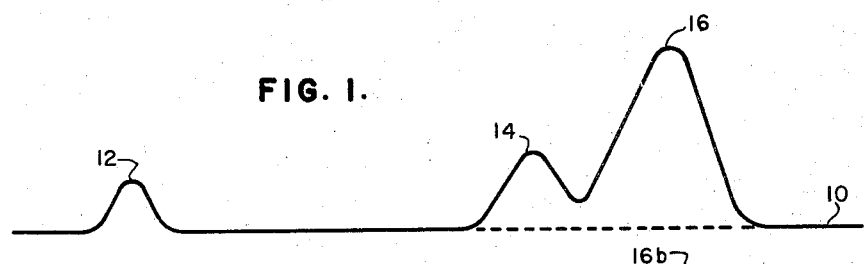
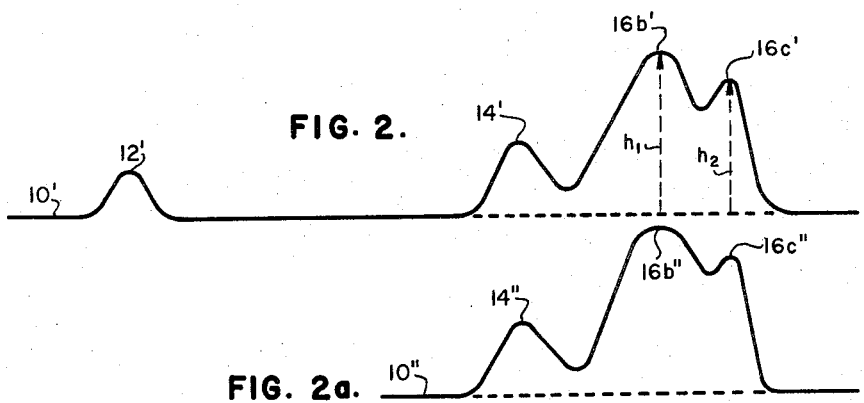
INVENTOR.
Rollie B. Williams,
BY Carl G. Ries
ATTORNEY.

Jan. 27, 1959    R. B. WILLIAMS    2,871,443
PROCESS FOR REGISTERING THE RELATIVE DEGREE OF BRANCHING
OF A HYDROCARBON MATERIAL CONTAINING ALKYL GROUPS AND
FOR CONTROLLING A PROCESS IN RESPONSE
TO THE REGISTRATION
Filed March 14, 1956                    2 Sheets-Sheet 2

INVENTOR.
Rollie B. Williams,

ATTORNEY.

United States Patent Office 2,871,443
Patented Jan. 27, 1959

2,871,443

PROCESS FOR REGISTERING THE RELATIVE DEGREE OF BRANCHING OF A HYDROCARBON MATERIAL CONTAINING ALKYL GROUPS AND FOR CONTROLLING A PROCESS IN RESPONSE TO THE REGISTRATION

Rollie B. Williams, Baytown, Tex., assignor, by mesne assignments, to Esso Research and Engineering Company, Elizabeth, N. J., a corporation of Delaware Application March 14, 1956, Serial No. 571,516

8 Claims. (Cl. 324—.5)

This invention relates to a process for obtaining a signal comprising a measure of the degree of branching of alkyl groups of a hydrocarbon material containing such groups. More particularly, this invention relates to a process for obtaining by high resolution nuclear magnetic resonance means a signal which is a measure of the degree of branching of alkyl groups in a hydrocarbon material containing such groups and to the control of a process for treating such hydrocarbon material in response to said signal.

The process of the present invention may be briefly described as magnetically resonating the nuclei of hydrogen atoms contained in a hydrocarbon material comprising aliphatic chains (i. e., alkyl groups) under high resolution nuclear magnetic resonance conditions to obtain a high resolution nuclear magnetic resonance signal having a methyl absorption band and a methylene absorption band and registering the ratio of the maximum intensity of the methyl absorption band to the maximum intensity of the methylene absorption band, whereby there is obtained a signal which is a measure of the degree of branching of the aliphatic chains; such signal also being a measure of at least some of the other properties of the hydrocarbon material, including, for example, naphthene ring concentration and/or relative crackability (in the case of petroleum gas oils and heavier fractions), viscosity index (in the case of petroleum lubricating oil fractions), octane number (in the case of petroleum gasoline fractions), cetane number (in the case of Diesel fuel boiling range hydrocarbons), etc. The ratio of the height of the methyl absorption band to the methylene absorption band is hereinafter referred to as the "branchiness index."

In accordance with a modification of the present invention a signal which is a measure of the branchiness index of a hydrocarbon material is obtained by nuclear magnetic resonance means and a process is controlled by regulating a process variable in response to the thus obtained signal.

The objects and advantages of the present invention will be apparent from the following specification when considered in conjunction with the accompanying drawings wherein:

Figs. 1, 1a, 2 and 2a are graphic representations of high resolution nuclear magnetic resonance absorption signals;

Figure 4:
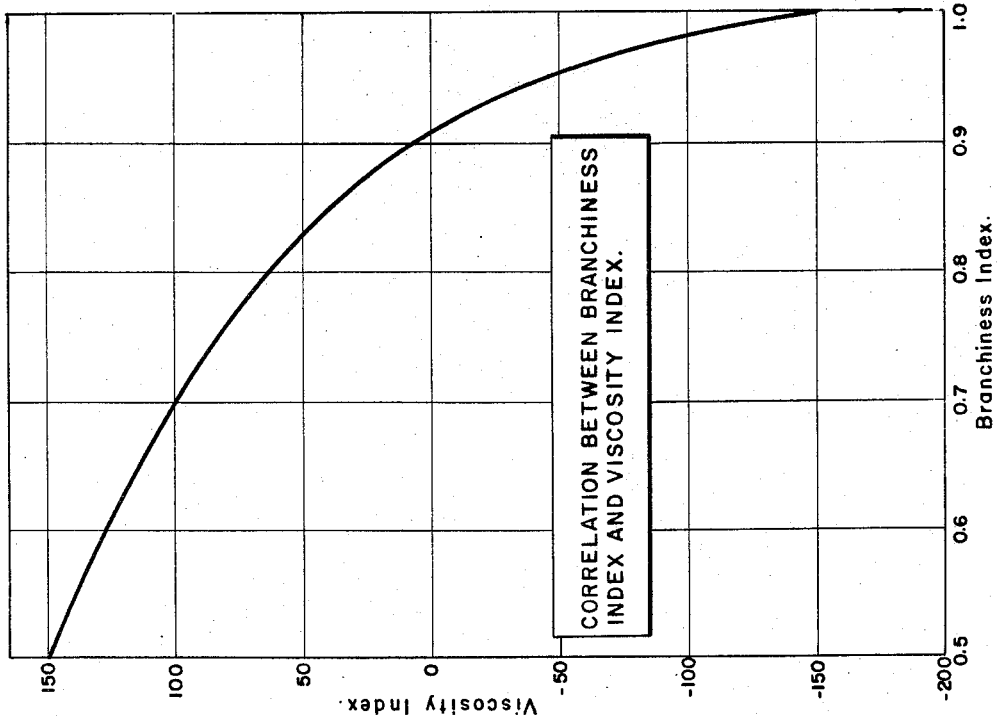
Fig. 4 is a graph illustrating the interrelationship of viscosity index to branchiness index.

The general subject of nuclear magnetic resonance has been dealt with in numerous publications such as the articles entitled "Magnetic Resonance" by K. K. Darrow (Bell System Technology Journal, vol. 32, pages 74–99 and 384–405, 1953), "Nuclear Magnetism" by Felix Bloch (American Scientist, vol. 43, pages 48–62, January 1955), etc. and in U. S. Patent No. 2,561,489 to Bloch et al. and U. S. Patent No. 2,561,490 to Varian. These and related publications disclose various nuclear magnetic resonance spectrometers such as those of the induction type, balanced bridge type, oscillating detector type, etc. which may be used to obtain high resolution nuclear magnetic resonance absorption signals.

A high resolution nuclear magnetic resonance signal is a nuclear magnetic resonance absorption signal obtained by precessing a nuclear species (i. e., hydrogen) of a sample in a homogeneous magnetic field having a homogeneity of about 1 to 10 parts per $10^7$, whereby the effect of chemical environment on the frequency of precession of a nuclear species is evidenced by resolution of the absorption signal into a plurality of intensity peaks representative of the various environments of the nuclear species in the material.

For best results the hydrogen-containing sample should be in liquid, free flowing form. A wide variety of hydrogen-containing materials are free flowing liquids at room temperature. It will be understod that if the material is excessively viscous, the measurement may be made at an elevated temperature whereby the material will be in a free flowing condition. Similarly, a normally gaseous material may be liquefied under pressure and the detection may be accomplished while such gaseous material is in a thus obtained liquefied state.

In accordance with one form of the present invention the hydrogen-containing material is dissolved in a solvent such as carbon disulfide, carbon tetrachloride, etc. which is a free flowing liquid and which is substantially free from hydrogen.

By way of expanation, hydrogen atoms ($H^1$) can be polarized in a strong unidirectional magnetic field and the nuclei of such atoms can be caused to precess when there is applied at right angles to the primary magnetic field a radio frequency magnetic field having a frequency equal to the frequency of precession of the $H^1$ nuclei. Precession of the nuclei can be detected by means known to those skilled in the art, such as in accordance with methods described in the aforementioned publications.

Actually there is a band of frequencies at which precession will occur rather than a single frequency. The main reason for this is that the field at a given nucleus is a superposition of the external applied unidirectional field plus the magnetic fields produced by the magnetic dipole moments of the nearest neighboring nuclei. The field at a nucleus due to a neighbor is proportional to the magnetic moment of the neighbor, inversely proportional to the cube of the distance between the nucleus and the neighbor, and is also dependent upon the relative orientations of the neighboring nuclei in the applied magnetic field. As a consequence, a given nucleus may find itself in a field equal to, slightly greater than, or slightly less than the applied unidirectional field. There will thus be a range of resonance frequencies rather than a single frequency of resonance for each nuclear species.

The range of frequencies may be resolved into a plurality of separately identifiable frequency bands for the same nuclear species under conditions of high resolution because of the so-called "chemical shift phenomenon" which is attributable to the magnetic shielding effect of electron charge clouds circulating about a particular nucleus. If the electronic charge density is great and is localized near the nucleus, a substantially higher applied radio frequency (for a given applied magnetic field) is required to cause precession of the nuclei whereas if there is only a light charge density so that the nucleus has more of a proton character only a slightly higher applied radio frequency is required, as compared to the radio frequency required to precess a base nucleus. A more detailed exposition of the chemical shift phenomenon and high resolution nuclear magnetic resonance signals may be obtained by reference to the literature and, particularly, the above identified "Magnetic Resonance" article by K. K. Darrow and the "Nuclear Magnetism" article by Felix Bloch. As is pointed out in an article by Bloch entitled, "Line Narrowing by Microscopic Motion" (Phys. Rev., 94, 496, April 15, 1954), the high resolution characteristics of a nuclear species may be more sharply defined by "spinning" the nuclear species, that is to say, by rotating a sample about a sample tube axis at the rate of about 200 to 1500 R. P. M.

In Fig. 1 there is shown, for purposes of illustration, a high resolution nuclear magnetic resonance signal of the type obtainable, for example, on a strip chart recorder. It will be noted that the signal 10 has a normally constant intensity outside the band width of resonant frequencies for the nuclear species (i. e., hydrogen) and that within the resonance band there are three separate identifiable peaks of intensity, namely, peak intensities 12, 14 and 16. The signal of Fig. 1 is representative of the type of high resolution signal obtainable by resonating the hydrogen nuclei in a petroleum hydrocarbon material containing aromatic nuclei and alkyl groups attached to the aromatic nuclei. The peak intensity 12 is contributed by hydrogen atoms attached to an aromatic nucleus. The peak intensity 14 is contributed by hydrogen atoms on methylene or methyl groups alpha to the aromatic nucleus and the peak intensity 16 is contributed by the remaining hydrogen atoms present in the sample.

It will be noted that the peaks 12, 14 and 16 vary in intensity. The intensity of each of the peaks is an indication of the relative concentration of the number of nuclei of each group in the sample. Thus, the signal of Fig. 1 would be indicative of the presence of a relatively small amount of aromatic hydrogen, a greater amount of hydrogen on alkyl carbon alpha to the aromatic nuclei and a still greater amount of hydrogen otherwise present in the sample (e. g., attached to paraffinic or naphthenic hydrocarbons or portions of aliphatic radicals attached to aromatic nuclei which are not alpha to the aromatic nuclei).

The intensity peak 16 may be still further resolved by the spinning technique described by Bloch (infra). In an ideal situation, as illustrated by Fig. 1a, the intensity peak 16 would be further resolved on spinning of the sample into peaks 16a, 16b and 16c; peak 16a being representative of naphthenic methylene groups, peak 16b being representative of paraffinic methylene groups and peak 16c being representative of hydrogen attached to methyl groups not alpha to an aromatic ring. As a practical matter, the paraffinic and naphthenic methylene groupings are so close together and of such relative concentrations that they are less easily resolved. However, resolutions can be obtained with comparative ease with respect to methylene and methyl groups.

Thus, a representative high resolution signal for a sample of petroleum hydrocarbon material obtained by spinning of the sample will be of the type set forth in Fig. 2 wherein a signal 10' is obtained having peak intensity locations at 12', 14', 16b' and 16c'; peak 12' corresponding to aromatic hydrogen, peak 14' corresponding to hydrogen attached to groups alpha to an aromatic ring, peak 16b' corresponding to hydrogen attached to naphthenic and paraffinic methylene groups not alpha to an aromatic ring and peak 16c corresponding to hydrogen attached to methyl groups not alpha to an aromatic ring. The ratio of methyl group peak intensity ($h_2$) to methylene group peak intensity ($h_1$) establishes the branchiness index referred to above.

It is to be understood, of course, that when the branchiness index is to be obtained, only a portion of the resonance band width of the hydrogen nuclei need be traversed to obtain a signal. Thus, as shown in Fig. 2a, a partial high resolution signal 10" may be obtained containing the peak locations 14", 16b" and 16c", such peak intensities having the meaning given above.

While the branchiness index established by the interrelationship of peak intensities for methyl and methylene groups has been graphically represented in Figs. 1 to 2a, as shown by strip chart tracings for high resolution nuclear magnetic resonance absorption signals, for purposes of illustration, it will be understood that the branchiness index may be obtained in the form of an electrical signal by electrically or electronically correlating the high resolution methyl intensity peak with the high resolution methylene intensity peak by means well known to those skilled in the art.

As has been indicated, the branchiness index for a hydrocarbon material obtained by high resolution nuclear magnetic resonance spectroscopic determination of a hydrocarbon sample is indicative of many of the characteristics of the sample.

The interrelation of sample characteristics to branchiness index may be considered in connection with the following specific examples which are given by way of illustration and which are not intended as limitations on the scope of this invention.

EXAMPLE I

*Interrelationship of naphthene ring content and branchiness index*

Figure 3:
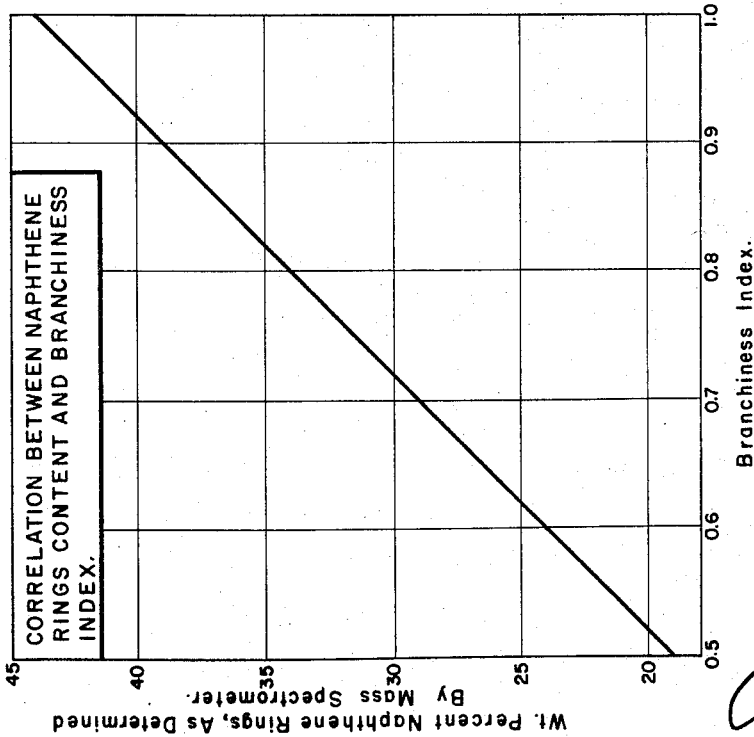
Fig. 3 is a graph illustrating the interrelationship of branchiness index to naphthenes concentration.

A direct correlation exists with respect to naphthene ring content and branchiness index as is shown in Fig. 3 wherein the branchiness index of samples obtained by high resolution nuclear magnetic resonance spectroscopic means is compared with the weight percentage of naphthene rings contained in such samples, as determined by mass spectroscopic means.

In deriving the correlation set forth in Fig. 3, a plurality of samples were analyzed by mass spectroscopic means in order to determine the weight percentage of naphthene rings in such samples. The samples were also subjected to high resolution nuclear magnetic resonance spectroscopic analysis in order to obtain the branchiness index for each sample. The materials tested, the branchiness indices obtained, and the naphthene rings content thus determined from both the branchiness index and the mass spectroscopic analyses are set forth in Table I.

TABLE 1.—NAPHTHENIC RING CONTENTS OF GAS OILS AND CYCLE STOCKS OBTAINED BY NUCLEAR MAGNETIC RESONANCE AND MASS SPECTROMETER

| Sample No. | Origin of Sample | Branchiness Index | Wt. Percent Naphthenic Rings (From Branchiness Index) | WT. Percent Naphthenic Rings (From Mass Spectroscopic Analysis) |
| --- | --- | --- | --- | --- |
| G356 | Catalytic Cracking Feed Stock. | 0.57 | 17.4 | 15.0 |
| G359 | El Segundo Gas Oil | 0.62 | 20.6 | 19.9 |
| G392 | Tia Juana Medium Gas Oil. | 0.59 | 18.7 | 16.7 |
| G393 | Tia Juana Gas Oil | 0.63 | 21.4 | 22.8 |
| G402 | Humble Process Gas Oil. | 0.65 | 22.4 | 23.4 |
| G415 | Lagunillas Heavy Gas Oil. | 0.64 | 21.6 | 20.8 |
| G416 | Bachaquero Heavy Gas Oil. | 0.62 | 21.1 | 20.8 |
| G422 | Billings Vacuum Gas Oil. | 0.53 | 15.5 | 15.1 |
| G436 | Bachaquero Gas Oil | 0.57 | 17.4 | 14.7 |
| G448 | Southern Louisiana Total Gas Oil. | 0.67 | 23.8 | 28.3 |
| G464 | Qatar Gas Oil | 0.55 | 16.7 | 16.4 |

From Table I, and specifically samples Nos. G356, G359, G392, G393, G402, G415, G416, G422, G436, G448, and G464, it is seen that the weight percent of naphthenes obtained by the branchiness index correlates with the weight percent of naphthene rings obtained by mass spectroscopic analysis.

EXAMPLE II

Interrelationship of branchiness index and crackability

As has been indicated, a measure of the susceptibility of petroleum hydrocarbons to thermal and catalytic cracking may be obtained by measuring the branchiness index of a petroleum hydrocarbon feed stock to be subjected to cracking operations as is shown by the following results.

Gas oil fractions derived from separate coastal crude oil petroleums were analyzed for aromatics content, non-aromatics content and naphthenes content. Branchiness index of each of the gas oil fractions was also determined. The gas oil fractions were then catalytically cracked under substantially identical conditions and the extent of conversion thereof measured. Results are set forth in Table II.

TABLE II.—CORRELATION BETWEEN CRACKABILITY AND BRANCHINESS INDEX

| Feed Stock | I | | II | |
|---|---|---|---|---|
| Branchiness Index | 0.869 | | 0.642 | |
| Composition of 600° F.+Material | Feed | Conversion, Wt. Percent | Feed | Conversion, Wt. Percent |
| Aromatics, Wt. Percent | 34 | 62 | 32 | 58 |
| Non-Aromatics, Wt. Percent | 66 | 64 | 68 | 47 |
| Total Naphthenes | 59 | 64 | 39 | 52 |

As is seen from Table II, sample numbers I and II had substantially the same non-aromatics content. However, sample number I contained a substantially larger percentage of naphthenes and, moreover, had a substantially greater branchiness index. With respect to conversion it will be noted that sample I, having the higher branchiness index, was much more susceptible to catalytic cracking than sample number II. Moreover, it is to be noted that the naphthenes of sample number I were also more susceptible to cracking than the naphthenes of sample number II.

EXAMPLE III

Interrelationship of viscosity index and branchiness index

A correlation exists between branchiness index and the viscosity index of non-aromatic hydrocarbons as is shown by the graph set forth in Fig. 4 wherein the branchiness index of a plurality of samples of light motor oil is compared with the viscosity index thereof.

In obtaining the correlation between viscosity index and branchiness index, a plurality of light motor oil samples derived from a Panhandle crude oil were subjected to high resolution nuclear magnetic resonance spectroscopic analysis in order to obtain branchiness indices of the samples. Materials tested and results obtained are set forth in Table III.

TABLE III.—INTERRELATIONSHIP OF BRANCHINESS INDEX AND VISCOSITY INDEX

| Thermal Diffusion Cut No. | Viscosity Index, V. I. | NMR* Branchiness, Index, B. I. |
|---|---|---|
| 1 | 192.1 | 0.49 |
| 2 | 161.7 | 0.52 |
| 3 | 142.9 | 0.54 |
| 4 | 122.7 | 0.63 |
| 5 | 101.8 | 0.68 |
| 6 | 86.7 | 0.74 |
| 7 | 72.3 | 0.78 |
| 8 | 46.9 | 0.82 |
| 9 | 2.9 | 0.91 |
| 10 | −35.0 | 0.93 |
| 11 | −141.9 | 1.00 |

*Nuclear magnetic resonance.

From Table III it is seen that there is a correlation between viscosity index and branchiness index so that a determination of the branchiness index of a sample will provide a measure of the viscosity index of the non-aromatic hydrocarbons in the sample.

This is of particular advantage in determining the extent to which lubricating oils may be derived from a petroleum hydrocarbon crude oil. Thus, a lubricating oil boiling range fraction may be separated from a crude oil by distillation. The thus obtained fraction will contain aromatic as well as non-aromatic hydrocarbons. By measuring the branchiness index of this material it is possible to determine a viscosity index which the non-aromatic hydrocarbons of the sample will have on removal of the aromatic hydrocarbons therefrom by suitable means such as solvent extraction. As a result, it is possible in accordance with the present invention to determine easily and accurately the value of a crude oil with respect to non-aromatic lubricating oil hydrocarbons obtainable therefrom.

In accordance with the present invention the octane number of fractions boiling in the gasoline range may be correlated with the branchiness index of such fractions and the cetane number of fractions boiling in the Diesel fuel range may be correlated with the branchiness index thereof.

Process control

In accordance with one embodiment of the present invention, a refinery or chemical process is controlled and regulated by high resolution nuclear magnetic resonance spectroscopic branchiness index determination. In many chemical and refining processes one or more liquid or liquefiable hydrocarbon streams will be discharged from a treating zone and it will frequently happen that the branchiness index of one or more of the discharge streams will be indicative of the effectiveness of treatment; which treatment may, as a consequence, be regulated in response to a signal which is a measure of the branchiness index of the material in such discharge stream. Illustrative chemical processes that may be regulated in this fashion include Fischer-Tropsch synthesis reactions, hydrogen treating reactions such as hydrogenation, hydroforming, autofining, hydrofining, hydrogen finishing, etc. reactions (either thermal or catalytic), alkylation reactions, sulfonation reactions, catalytic and thermal cracking reactions, solvent extraction processes, fractional distillation processes, fractional crystallization processes, etc.

When a chemical or refining process is to be controlled in accordance with the present invention, the sample holder of a nuclear magnetic resonance spectrometer may be fluidly connected with one of the discharge streams in any suitable manner and the detecting means of the nuclear magnetic resonance spectrometer may be connected with a responsive control member in the same or a different stream in any suitable manner for regulating a process variable such as the rate or quantity of charge or discharge, temperature, pressure, etc. in response to the branchiness index signal of the monitored stream, as determined by a nuclear magnetic resonance spectrometer.

Control of a distillation process

As a specific example, a distillation process may be regulated. Thus, a hydrocarbon charge stock may be charged to a distillation column at a controllable rate and fractionated in the column to obtain a plurality of component fractions, each of which fractions boils in a different range. For example the mixture of normal and iso-octanes can be fractionated in a distillation column to provide a vaporized overheads iso-octane fraction and a bottoms normal octane fraction. The overhead vapors are condensed and a portion of the condensate is returned to the distillation tower as reflux. As is well known to those skilled in the art, it is possible to provide for an overhead fraction having a desired boiling range by regulating the amount of condensed overheads returned as reflux, by regulating the feed rate to the distillation column, by regulating the distillation temperature of the distillation column, etc.

Thus, the overheads iso-octane condensate may be periodically monitored by nuclear magnetic resonance spectroscopic means to obtain a signal which is a measure of the branchiness index of the condensate. The signal may then be used to control the rate of reflux or any of the several process variables such as feed rate, temperature, etc. in response to significant changes in branchiness index signal (indicative of the presence of normal octanes in the overheads condensate). That is to say, if the branchiness index signal reflects the presence of normal octanes in the condensate, the rate of reflux may be increased, the rate of feed may be decreased or the temperature in the distillation column may be increased whereby proper fractionation will be obtained. It will be understood that two or more of such factors may be simultaneously regulated if desired in response to the nuclear magnetic resonance branchiness index signal.

Regulation of a cracking process

As another specific example, a thermal or catalytic cracking process may be regulated by means of a nuclear magnetic resonance branchiness index signal.

It is conventional practice to subject a hydrocarbon cracking feed stock such as a gas oil fraction, a de-asphalted oil or the like to thermal or catalytic cracking conditions in order to convert at least a portion of such feed stock to more valuable lower boiling products such as gasoline boiling range products. In conducting such operations it is also conventional practice to collect the hydrocarbon products after passage of the feed stock through the cracking reactor and to segregate such products into a plurality of fractions by suitable means such as distillation, etc. Thus, there may be obtained a fraction comprising normally gaseous hydrocarbons, a gasoline boiling range fraction, a kerosene boiling range fraction, a gas oil fraction, etc. Normally, at least one of the fractions thus segregated will have the boiling range of the feed stock for the cracking process. For example, if the feed stock is a gas oil fraction, a gas oil boiling range product fraction will also be obtained.

In accordance with the present invention the branchiness index of the product fraction boiling in the range of the feed is measured whereby, as shown above, a measure of the crackability of such product fraction is obtainable. It will be apparent that in this situation the determination of crackability will also provide a determination of the relative efficiency of the cracking operation. Thus, the branchiness index may show the product fraction still to have substantial cracking susceptibility indicating, for example, that additional valuable products may be obtained by recycling the product fraction through the reactor in admixture with the feed stock.

Accordingly, when a branchiness index signal of the product fraction boiling in the range of the feed is obtained, it is possible to regulate a cracking process variable in response to such signal in order to regulate the operation of the process. Thus, for example, recycle rate, temperature, contact time, etc. may be regulated in response to the signal in order to provide for optimum cracking conditions in the cracking reactor.

It will be understood that the foregoing examples have been given by way of illustration and not by way of limitation in that a wide variety of chemical and refinery processes may be controlled in accordance with the present invention in the indicated manner. The objects and advantages of the present invention having been ascertained, what is claimed is:

1. A method for controlling a treating process wherein a hydrocarbon product containing aliphatic chains is produced as a part of the process and wherein the degree of branching of the aliphatic chains contained in said product is a measure of the effectiveness of treatment, said method comprising the steps of obtaining a sample of said product, subjecting said sample to high resolution nuclear magnetic resonance spectroscopic analysis under conditions to obtain a signal constituting a measure of the concentration of methylene groups not alpha to an aromatic ring relative to the concentration of methyl groups not alpha to an aromatic ring and regulating a treating process variable in response to said signal.

2. A method as in claim 1 wherein the treating process is a distillation process, wherein the product is a reflux stream for the distillation process consisting of condensed overheads derived therefrom and wherein a distillation process variable is regulated in response to said signal.

3. A method as in claim 2 wherein the process variable is the rate of reflux.

4. A method as in claim 2 wherein the process variable is temperature.

5. A method as in claim 2 wherein the process variable is the charge rate.

6. A method as in claim 1 wherein the treating process is a process for the catalytic cracking of a petroleum hydrocarbon gas oil fraction, wherein the product is a gas oil boiling range product fraction, and wherein a catalytic cracking process variable is regulated in response to said signal.

7. A method for obtaining a measure of physical and chemical properties of a hydrocarbon material containing aliphatic chains which comprises obtaining a sample of said material and subjecting said sample to high resolution nuclear magnetic resonance spectroscopic analysis under conditions to obtain a measurement of the ratio of the concentration of methyl groups not alpha to an aromatic ring relative to the concentration of methylene groups not alpha to an aromatic ring, and plotting said ratio relative to naphthene ring concentration to determine the weight percentage of naphthene rings in said material.

8. A method for obtaining a measure of physical and chemical properties of a hydrocarbon material containing aliphatic chains which comprises obtaining a sample of said material and subjecting said sample to high resolution nuclear magnetic resonance spectroscopic analysis under conditions to obtain a measurement of the ratio of the concentration of methyl groups not alpha to an aromatic ring relative to the concentration of methylene groups not alpha to an aromatic ring, and plotting said ratio relative to viscosity index to determine the viscosity index of non-aromatic components of said material.

References Cited in the file of this patent

"Journal of Chemical Physics," vol. 21, pages 2092–2093 (1953), article by Jarrett, Sadler and Schoolery.

"Bell System Technical Journal," vol. 32, pages 74–99 (1953), article by Darrow, "Magnetic Resonance."

"Nuclear Magnetic Resonance," book by E. R. Andrew (1955), pages 141–146, published by Cambridge University Press, London.

"Physical Review," vol. 102, pp. 136–167 (April 1, 1956), Magnetic Resonances of Protons in Ethyl Alcohol by Arnold and "Nuclear Magnetic Resonance Spectra of Some Hydrocarbons" by Anderson.